United States Patent
Nishida et al.

(10) Patent No.: US 9,634,346 B2
(45) Date of Patent: Apr. 25, 2017

(54) MEMBRANE ELECTRODE ASSEMBLY AND FUEL CELL BATTERY

(71) Applicant: TOYOTA JIDOSHA KABUSHIKI KAISHA, Toyota-shi, Aichi-ken (JP)

(72) Inventors: Tsunemasa Nishida, Nagoya (JP); Hiroo Yoshikawa, Toyota (JP); Junji Nakanishi, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/878,064

(22) Filed: Oct. 8, 2015

(65) Prior Publication Data
US 2016/0104910 A1    Apr. 14, 2016

(30) Foreign Application Priority Data
Oct. 10, 2014  (JP) .................. 2014-208571

(51) Int. Cl.
| | |
|---|---|
| *H01M 8/10* | (2016.01) |
| *H01M 8/1004* | (2016.01) |
| *H01M 8/04082* | (2016.01) |
| *H01M 8/1062* | (2016.01) |
| *H01M 8/04291* | (2016.01) |
| *H01M 8/1213* | (2016.01) |
| *H01M 8/1067* | (2016.01) |

(52) U.S. Cl.
CPC ..... *H01M 8/1004* (2013.01); *H01M 8/04201* (2013.01); *H01M 8/04291* (2013.01); *H01M 8/1062* (2013.01); *H01M 8/1067* (2013.01); *H01M 8/1213* (2013.01)

(58) Field of Classification Search
CPC ......... H01M 8/04201; H01M 8/04291; H01M 8/1004; H01M 8/1062; H01M 8/1067; H01M 8/1213; H01M 8/1226
See application file for complete search history.

(56) References Cited

U.S. PATENT DOCUMENTS

2008/0241641 A1   10/2008 Kurita et al.

FOREIGN PATENT DOCUMENTS

| JP | 2008-525943 A | 7/2008 |
|---|---|---|
| JP | 2008-243453 | 10/2008 |

(Continued)

*Primary Examiner* — Patrick Ryan
*Assistant Examiner* — Ben Lewis
(74) *Attorney, Agent, or Firm* — Finnegan, Henderson, Farabow, Garrett & Dunner, LLP (57) ABSTRACT

A membrane electrode assembly for use in a fuel cell battery includes: an electrolyte membrane; an anode catalyst layer formed on a first surface of the electrolyte membrane; a cathode catalyst layer formed on a second surface of the electrolyte membrane; an anode gas diffusion layer stacked on the anode catalyst layer; and a cathode gas diffusion layer stacked on the cathode catalyst layer. The anode catalyst layer, the cathode catalyst layer, the anode gas diffusion layer, and the cathode gas diffusion layer have the same thermal insulation performance per thickness. The membrane electrode assembly satisfies all relations of T1+T3<T2+T4, T1<T2, and T3>T4 where thicknesses of the anode catalyst layer, the cathode catalyst layer, the anode gas diffusion layer, and the cathode gas diffusion layer in a stacking direction are defined as T1, T2, T3, and T4, respectively.

3 Claims, 5 Drawing Sheets

(56) References Cited

FOREIGN PATENT DOCUMENTS

| | | | |
|---|---|---|---|
| JP | 2012-243630 A | * 10/2012 | .............. H01M 8/02 |
| JP | 2012-243630 | 12/2012 | |
| JP | 2013-120657 A | 6/2013 | |
| WO | WO 2005/122298 A2 | 12/2005 | |

* cited by examiner

| | ANODE CATALYST LAYER THICKNESS T1 [μm] | CATHODE CATALYST LAYER THICKNESS T2 [μm] | ANODE GAS DIFFUSION LAYER THICKNESS T3 [μm] | CATHODE GAS DIFFUSION LAYER THICKNESS T4 [μm] | T1+T3 | T2+T4 | $\frac{T2+T4}{T1+T3}$ |
|---|---|---|---|---|---|---|---|
| SAMPLE 1 | 3.5 | 10.5 | 159 | 156 | 162.5 | 166.5 | 1.02 |
| SAMPLE 2 | 3.5 | 20 | 159 | 156 | 162.5 | 176 | 1.08 |
| SAMPLE 3 | 10.5 | 10.5 | 159 | 159 | 169.5 | 169.5 | 1.00 |
| SAMPLE 4 | 10.5 | 20 | 159 | 126 | 169.5 | 146 | 0.86 |

FIG. 5

MEMBRANE ELECTRODE ASSEMBLY AND FUEL CELL BATTERY

INCORPORATION BY REFERENCE

The disclosure of Japanese Patent Application No. 2014-208571 filed on Oct. 10, 2014 including the specification, drawings and abstract is incorporated herein by reference in its entirety.

BACKGROUND OF THE INVENTION

1. Field of the Invention

The present invention relates to a membrane electrode assembly for use in a fuel cell battery, and also to a fuel cell battery.

2. Description of Related Art

Japanese Patent Application Publication No. 2012-243630 describes a membrane electrode assembly and a fuel cell battery that satisfy relations of T1+T3≥T2+T4, T1<T2, T3>T4 where a thickness of an anode catalyst layer in a stacking direction. is defined as T1, a thickness of a cathode catalyst layer in the stacking direction is defined as T2, a thickness of an anode gas diffusion layer in the stacking direction is defined as T3, and a thickness of an cathode gas diffusion layer in the stacking direction is defined as T4.

SUMMARY OF THE INVENTION

However, it has been found that it is difficult to enhance thermal insulation on the cathode side depending on dimensional relations of T1+T3 and T2+T4 in some cases. In a high-temperature low-humid condition, the anode is likely to be dried, and thus it is desired to send generated water generated by the cathode toward the anode. Unfortunately, it has been found that in a conventional configuration, it is difficult to accelerate transfer of water from the cathode to the anode.

The present invention provides a membrane electrode assembly and a fuel cell battery capable of enhancing thermal insulation on the cathode side more than thermal insulation on the anode side, and accelerating transfer of water from the cathode to the anode.

A membrane electrode assembly for use in a fuel cell battery according to an aspect of the present invention includes: an electrolyte membrane; an anode catalyst layer formed on a first surface of the electrolyte membrane; a cathode catalyst layer formed on a second surface of the electrolyte membrane; an anode gas diffusion layer stacked on the anode catalyst layer; and a cathode gas diffusion layer stacked on the cathode catalyst layer. The anode catalyst layer, the cathode catalyst layer, the anode gas diffusion layer, and the cathode gas diffusion layer have the same thermal insulation performance per thickness. The membrane electrode assembly satisfies all relations of T1+T3<T2+T4, T1<T2, and T3>T4 where a thickness of the anode catalyst layer in a stacking direction is defined as T1, a thickness of the cathode catalyst layer in the stacking direction is defined as T2, a thickness of the anode gas diffusion layer in the stacking direction is defined as T3, a thickness of the cathode gas diffusion layer in the stacking direction is defined as T4. According to this aspect, it is possible to enhance the thermal insulation on the cathode side more than the thermal insulation on the anode side, and accelerate the transfer of the water from the cathode to the anode.

In the above aspect, the anode catalyst layer, the cathode catalyst layer, the anode gas diffusion layer, and the cathode gas diffusion layer may include carbon. A major factor that governs the thermal isolation is carbon. Both the cathode catalyst layer and the anode catalyst layer include carbon carrying a catalyst of these layers, and the anode gas diffusion layer and the cathode gas diffusion layer also include carbon, thus enhancing the thermal insulation on the cathode side more than the thermal insulation on the anode side. Accordingly, it is possible to accelerate the transfer of the water from the cathode to the anode.

The present invention can be embodied in various aspects. For example, the present invention can also be embodied in a form of a fuel cell battery including the membrane electrode assembly or the like, other than in a form of the membrane electrode assembly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
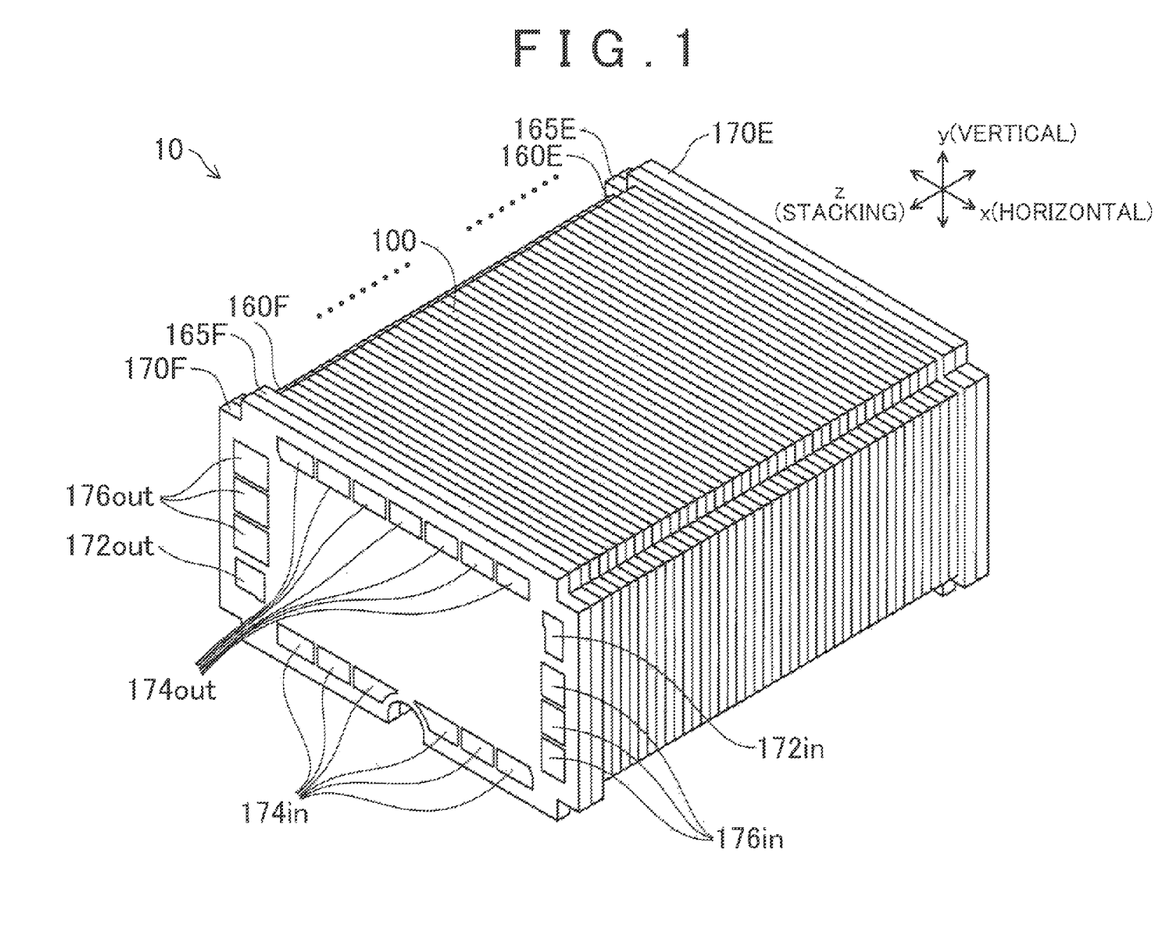
FIG. 1 is a schematic perspective view showing a configuration of a fuel cell battery as an embodiment of the present invention.

FIG. 1 is a schematic perspective view showing a configuration of a fuel cell battery 10 as an embodiment of the present invention. The fuel cell battery 10 has a stack structure including unit cells 100 as fuel cells stacked in a Z direction (referred to also as a "stacking direction", hereinafter), and holding these cells between a pair of end plates 170F, 170E. The fuel cell battery 10 includes a terminal plate 160F at a front end position between the end plate 170E at the front end position and the unit cell 100 with an insulating plate 165F at the front end position disposed therebetween. The fuel cell battery 10 also includes a terminal plate 160E at a rear end position between an end plate 170E at the rear end position and the unit cell 100 with an insulating plate 165E at the rear end position therebetween. Each of the unit cells 100, the terminal plates 160F, 160E, the insulating plates 165F, 165E, and the end plates 170F, 170E has a plate structure having a substantially rectangular outline shape, and is disposed such that each longer side thereof extends in an X direction (horizontal direction), and each shorter side thereof extends in a Y direction (vertical direction, perpendicular direction).

Each of the end plate 170F, the insulating plate 165F, and the terminal plate 160F at the front end position includes a fuel gas supply hole 172in and a fuel gas exhaust hole 172out, plural oxidizer gas supply holes 174in and plural oxidizer gas exhaust holes 174out, and plural coolant supply holes 176in and plural coolant exhaust holes 176out. These supply holes and exhaust holes are coupled to respective holes (not shown) formed at respective corresponding positions in each unit cell 100, thereby forming respective corresponding gas supply manifolds and respective corresponding gas exhaust manifolds, and respective corresponding coolant supply manifolds and respective corresponding coolant exhaust manifolds. Meanwhile, no supply holes and no exhaust holes are formed in the end plate 170E, the insulating plate 165E, and the terminal plate 160E at the rear end position, respectively. This is because the fuel cell battery 10 is a fuel cell battery of a type that supplies reactant gases (fuel gas, oxidizer gas) and the coolant from the end plate 170F at the front end position to every unit cell 100 through the supply manifolds, and exhausts exhaust gas and drain water from every unit cell 100 through the exhaust manifolds from the end plate 170F at the front end position to the outside. However, the fuel cell battery 10 is not limited to this type, and various types may be employed such that the reactant gases and the coolant are supplied from the end plate 170F at the front end position, and the exhaust gas and the drain water are exhausted from the end plate 170E at the rear end position to the outside, for example.

The plural oxidizer gas supply holes 174in are arranged at an outer edge of a lower end of the end plate 170F at the front end position in the X direction (longer side direction), and the plural oxidizer gas exhaust holes 174out are arranged at an outer edge of an upper end of the end plate 170F in the X direction. The fuel gas supply hole 172in is disposed at an uppermost position of an outer edge of a right end of the end plate 170F at the front end position in the Y direction (shorter side direction), and the fuel gas exhaust hole 172out is disposed at a lowermost position of an outer edge of a left end of the end plate 170F in the Y direction. The plural coolant supply holes 176in are arranged in the Y direction below the fuel gas supply hole 172in, and the plural coolant exhaust holes 176out are arranged in the Y direction above the fuel gas exhaust hole 172out.

The terminal plate 160F at the front end position and the terminal plate 160E at the rear end position are current collectors for generated output of the unit cells 100, and output collected electric power from a terminal (not shown) to the outside.

Figure 2:
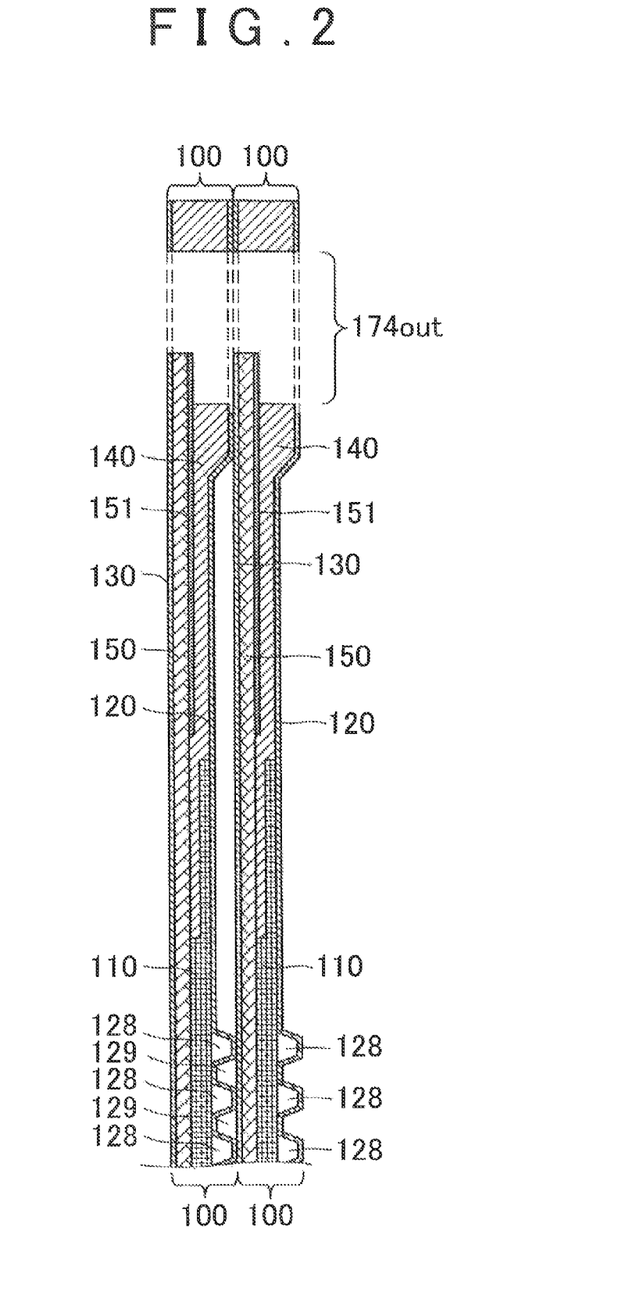
FIG. 2 is a sectional view schematically showing a vicinity of oxidizer gas exhaust holes of unit cells.

FIG. 2 is a cross sectional view schematically showing vicinities of the oxidizer gas exhaust holes 174out of the unit cells 100. Each unit cell 100 includes a membrane electrode gasket assembly 110 (referred to also as a "MEGA 110" or a "membrane electrode assembly", hereinafter), a seal member 140, a cathode separator 130, an anode separator 120, a gas flow passage member 150, and a sealing plate 151. A vicinity of the oxidizer gas supply hole 174in has the same configuration as the configuration of the oxidizer gas exhaust hole 174out only except for having an inverted upward and downward direction, and thus description thereof will be omitted.

The seal member 140 is a member that supports the MEGA 110 from its outer edge, and is formed of resin. The seal member 140 bonds the cathode separator 130 and the anode separator 120 so as to seal leakage of the oxidizer gas, the fuel gas, and the coolant. The sealing plate 151 is disposed on the cathode side of the seal member 140. The sealing plate 151 is a metal plate, and a part thereof projects into the oxidizer gas exhaust hole 174out. The gas flow passage member 150 is disposed on the cathode side of the MEGA 110, the seal member 140, and the sealing plate 151. The gas flow passage member 150 is a flow passage for flowing the oxidizer gas, and is formed of expanded metal, for example. It should be noted that instead of using the expanded metal, the gas flow passage member 150 may be formed of a porous metallic material of another type. The gas flow passage member 150 projects into the oxidizer gas exhaust hole 174out to the same position as that of the sealing plate 151. In FIG. 2, respective projecting dimensions of the cathode separator 130, the gas flow passage member 150, and the sealing plate 151 are schematically illustrated.

The cathode separator 130 is disposed adjacent to the gas flow passage member 150 on a next unit cell 100 side. The cathode separator 130 is a metal plate, and a part thereof projects into the oxidizer gas exhaust hole 174out. The anode separator 120 is disposed to surfaces of the MEGA 110 and the seal member 140 opposite to the gas flow passage member 150. The anode separator 120 is a metal plate having recesses and projections. The anode separator 120 does not project into the oxidizer gas exhaust hole 174out. Fuel gas flow passages 128 are formed between the anode separator 120 and the MEGA 110, and coolant flow passages 129 are formed between the anode separator 120 and a cathode separator 130 of a next unit cell 100 that faces this anode separator 120.

Figure 3:
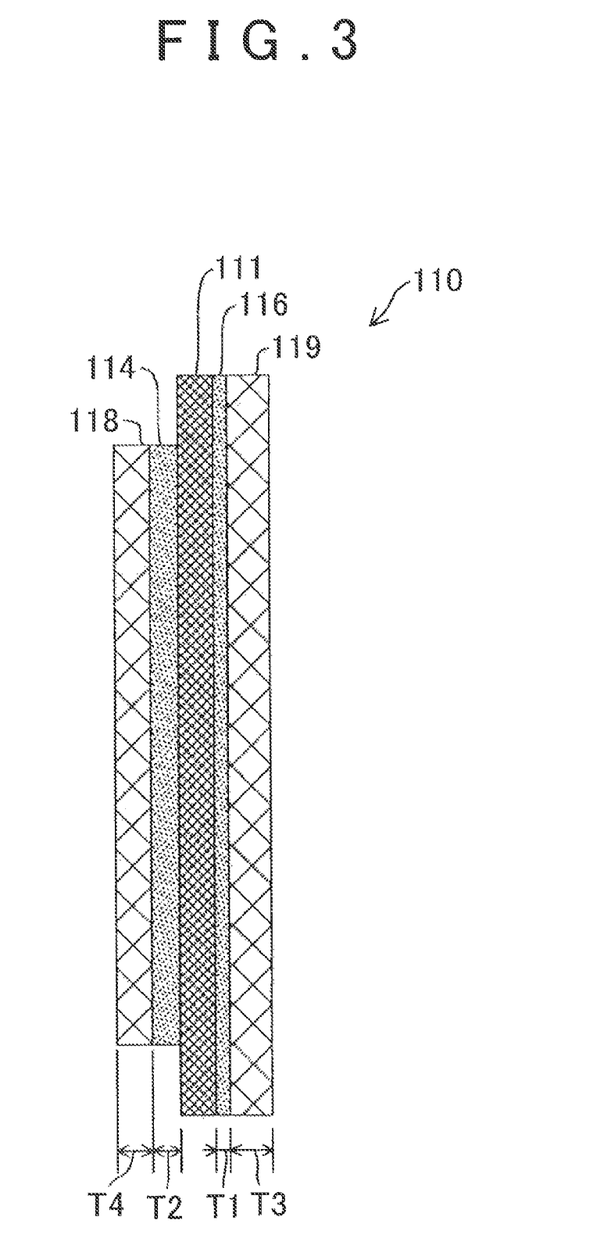
FIG. 3 is an explanatory view showing a configuration of a MEGA 110.

FIG. 3 is an explanatory view showing a configuration of the MEGA 110. The MEGA 110 includes an electrolyte membrane 111, a cathode catalyst layer 114, an anode catalyst layer 116, a cathode gas diffusion layer 118, and an anode gas diffusion layer 119. The electrolyte membrane 111 is an electrolyte membrane having proton conductivity, and a fluorine electrolyte resin (ion exchange resin), such as a perfluorocarbon sulfonic acid polymer, is used for the electrolyte membrane 111.

The cathode catalyst layer 114 and the anode catalyst layer 116 include carbon carrying a catalyst (e.g., platinum). In the present embodiment, the anode catalyst layer 116 is applied across an entire first surface of the electrolyte membrane 111, but the cathode catalyst layer 114 is applied only on a partial region (electric power generating region) of a second surface of the electrolyte membrane 111. This is because the anode catalyst layer 116 requires less catalyst quantity per unit area (typically ½ or less, e.g., approximately ⅓) compared with that of the cathode catalyst layer 114, and thus even application of the catalyst across the entire area of the first surface of the electrolyte membrane 111 is not wasting excess, and this application manner rather facilitates the application procedure.

The cathode gas diffusion layer 118 is disposed on the cathode catalyst layer 114, and the anode gas diffusion layer 119 is disposed on the anode catalyst layer 116. The cathode gas diffusion layer 118 and the anode gas diffusion layer 119 are both formed of carbon paper. It should be noted that instead of the carbon paper, these layers may be formed of carbon non-woven.

In the present embodiment, in each MEGA 110, the following three formulas are all satisfied where a thickness of the anode catalyst layer 116 in the stacking direction is defined as T1, a thickness of the cathode catalyst layer 114 in the stacking direction is defined as T2 a thickness of the anode gas diffusion layer 119 in the stacking direction is defined as T3, and a thickness of the cathode gas diffusion layer 118 in the stacking direction is defined as T4.

$$T1+T3<T2+T4 \quad (1)$$

$$T1<T2 \quad (2)$$

$$T3>T4 \quad (3)$$

In this case, if Formula (1) and Formula (3) are satisfied, Formula (2) is necessarily satisfied.

Specifically, if Formula (1) is satisfied, that is, if it is satisfied that a sum of the thickness of the cathode catalyst layer 114 and the thickness of the cathode gas diffusion layer 118 (T2+T4) is greater than a sum of the thickness of the anode catalyst layer 116 and the thickness of the anode gas diffusion layer 119 (T1+T3), it is possible to enhance thermal insulation on the cathode side (thermal insulation of the cathode catalyst layer 114 and the cathode gas diffusion layer 118) more than thermal insulation on the anode side (thermal insulation of the anode catalyst layer 116 and the anode gas diffusion layer 119). A major factor that governs the thermal isolation is carbon. Both the cathode catalyst layer 114 and the anode catalyst layer 116 include carbon carrying the catalyst. The cathode gas diffusion layer 118 and the anode gas diffusion layer 119 are formed of carbon paper, and thus contain carbon fibers as a basic material thereof. If the cathode gas diffusion layer 118 and the anode gas diffusion layer 119 have water repellency, these layers contain carbon particles as a material forming water-repellent layers. In this manner, the cathode catalyst layer 114, the anode catalyst layer 116, the cathode gas diffusion layer 118, and the anode gas diffusion layer 119 include carbon as the factor governing the thermal insulation, and the thermal insulation performance relative to the thickness is substantially the same regardless of the catalyst layers or the gas diffusion layers. This means that each catalyst layer and each gas diffusion layer have substantially the equal thermal insulation performance per thickness. Accordingly, the degree of the thermal insulation can be evaluated by a summed thickness of the catalyst layer and the gas diffusion layer.

In the present embodiment, in each MEGA 110, the thickness T2 of the cathode catalyst layer 114 in the stacking direction is formed to be greater than the thickness T1 of the anode catalyst layer 116 in the stacking direction. With this configuration, the thermal insulation of the cathode catalyst layer 114 can be enhanced more than the thermal insulation of the anode catalyst layer. By satisfying Formula (1), the thermal insulation on the cathode side can be enhanced more than the thermal insulation on the anode side so as to transfer water toward the anode side; and by satisfying Formula (2), generated water generated by the cathode catalyst layer 114 can be more effectively diffused toward the anode catalyst layer 116. if the thermal insulation on the cathode side is greater than the thermal insulation on the anode side, the cathode temperature becomes higher than the anode temperature. As a result, a partial water vapor pressure on the cathode side becomes higher than a partial water vapor pressure on the anode side. This difference in partial water vapor pressure accelerates transfer of the water from the cathode to the anode.

In the present embodiment, the thickness T3 of the anode gas diffusion layer 119 in the stacking direction is formed to be thicker than the thickness T4 of the cathode gas diffusion layer 118. By satisfying formula (3), gas diffusion in the cathode gas diffusion layer 118 can be greater than gas diffusion in the anode gas diffusion layer 119, thereby enhancing draining performance of the cathode gas diffusion layer 118.

Figure 4:
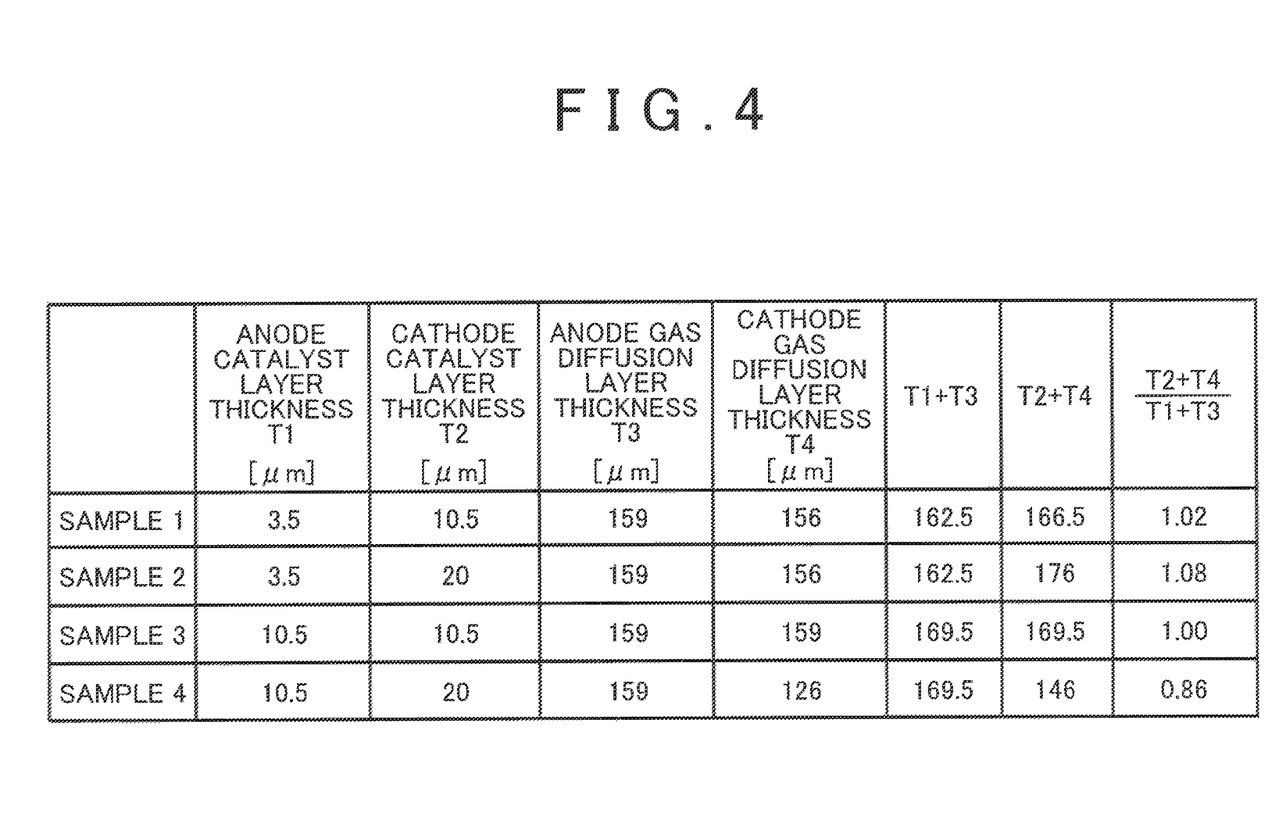
FIG. 4 is an explanatory view comprehensively showing thicknesses of catalyst layers and gas diffusion layers of each sample.

FIG. 4 is an explanatory view comprehensively showing respective thicknesses of the catalyst layer and the gas diffusion layer of each sample. Each thickness represents a value in a state in which each unit cell 100 is fastened into the fuel cell battery 10. In FIG. 4, instead of using Formula (1), (T2+T4)/(T1+T3) is used. If a value of (T2+T4)/(T1+T3) is greater than 1, Formula (1) is satisfied.

In Sample 1, the thickness T1 of the anode catalyst layer is 3.5 μm, the thickness T2 of the cathode catalyst layer is 10.5 μm, the thickness T3 of the anode gas diffusion layer is 159 μm, and the thickness T4 of the cathode gas diffusion layer is 156 μm. Sample 1 satisfies all Formulas (1) to (3).

In Sample 2, the thickness T1 of the anode catalyst layer is 3.5 μm, the thickness 12 of the cathode catalyst layer is 20 μm, the thickness T3 of the anode gas diffusion layer is 159 μm, and the thickness 14 of the cathode gas diffusion layer is 156 μm. Sample 2 satisfies all Formulas (1) to (3).

In Sample 3, the thickness T1 of the anode catalyst layer is 10.5 μm, the thickness T2 of the cathode catalyst layer is 10.5 μm, the thickness T3 of the anode gas diffusion layer is 159 μm, and the thickness T4 of the cathode gas diffusion layer is 159 μm. Sample 3 has relations of T1=T2, T3=T4, T1+T3=T2+T4, and satisfies none of Formulas (1) to (3).

In Sample 4, the thickness T1 of the anode catalyst layer is 10.5 μm, the thickness T2 of the cathode catalyst layer is 20 μm, the thickness T3 of the anode gas diffusion layer is 159 μm, and the thickness T4 of the cathode gas diffusion layer is 126 μm. Sample 4 satisfies Formulas (2) and (3), but has a relation of T1+T3>T2+T4; thus Sample 4 does not satisfies Formula (1).

Figure 5:
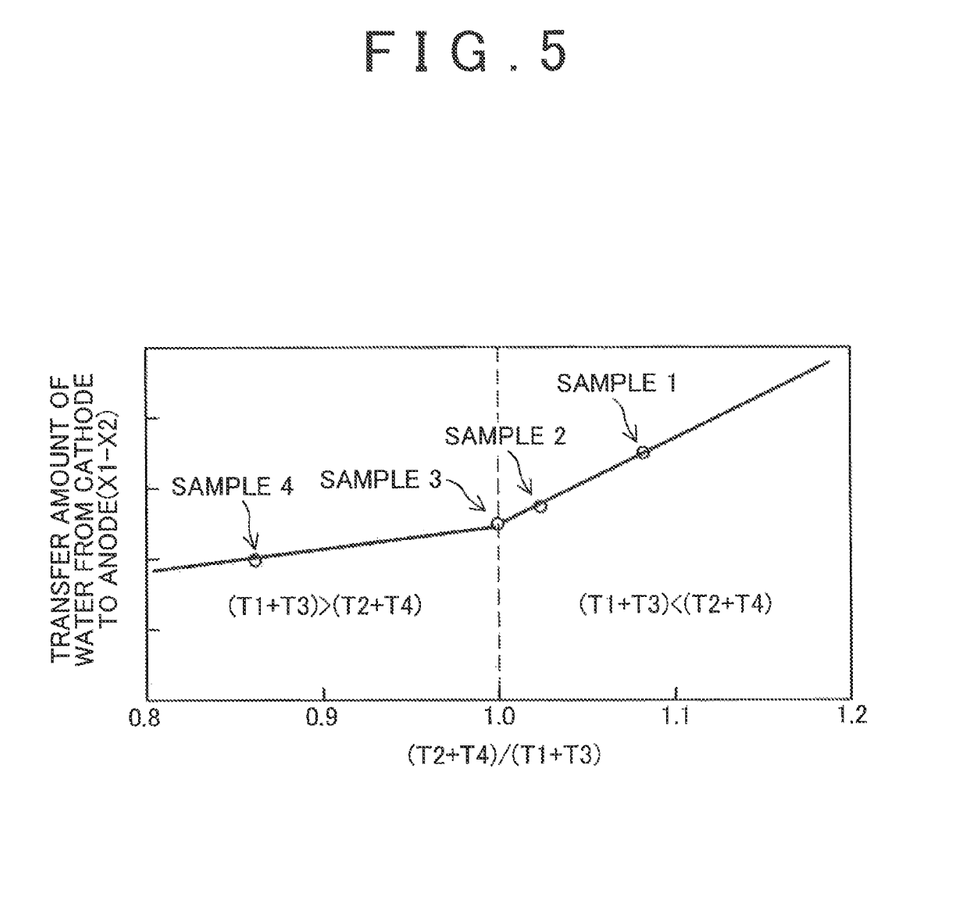
FIG. 5 is an explanatory view showing a relation between a value of (T2+T4)/(T1+T3) and transfer amount of water from a cathode to an anode.

FIG. 5 is an explanatory view showing a relation between a value of (T2+T4)/(T1+T3) and transfer amount of the water from the cathode to the anode. The transfer amount of the water was measured in the following manner. As Step 1, an oxygen gas and an anode gas were supplied to the unit cells 100 to generate electric power. Thereafter, power generation by the unit cells was stopped. Water remained in the anode and the cathode of the unit cells 100. As Step 2, the anode gas for the anode was supplied so as to drain the water remaining in the anode. The water remained in the cathode at this time. As Step 3, a weight X1 of the unit cells 100 was measured. As Step 4, the unit cells 100 were left as they were. As a result, the water remaining in the cathode was transferred to the anode. As Step 5, the anode gas for the anode was supplied so as to drain the water on the anode side. The water drained at this time was the water transferred from the cathode. As Step 6, a weight X2 of the unit cells 100 was measured. As Step 7, the transfer amount of the water from the cathode to the anode was calculated. The transfer amount of the water was calculated by using Formula: X1−X2.

As apparent from FIG. 5, it is understood that as a value of (T2+T4)/(T1+T3) becomes greater, the transfer amount of the water from the cathode to the anode becomes greater. In addition, it is also understood that if the value of (T2+T4)/(T1+T3) becomes greater than 1, that is, if (T1+T3)<(T2+T4) is satisfied, the slope on the graph becomes greater, and thus the transfer amount of the water from the cathode to the anode is further accelerated.

According to the present embodiment, the membrane electrode gasket assembly 110 satisfies all the relations of T1+T3<T2+T4, T1<T2, and T3>T4 where the thickness of the anode catalyst layer 116 in the stacking direction is defined as T1, the thickness of the cathode catalyst layer 114 in the stacking direction is defined as T2, the thickness of the anode gas diffusion layer 119 in the stacking direction is defined as T3, and the thickness of the cathode gas diffusion layer 118 in the stacking direction is defined as T4; therefore, it is possible to enhance the thermal insulation on the cathode side more than the thermal insulation on the anode side, thus accelerating the transfer amount of the water from the cathode to the anode.

In the present embodiment, the major factor governing the thermal insulation is set to be carbon, and carbon is used in the cathode catalyst layer 114 and the anode catalyst layer 116 as a carrier carrying the catalyst, and carbon paper containing carbon fibers is used as the base material of the cathode gas diffusion layer 118 and the anode gas diffusion layer 119. However, the carrier carrying the catalyst may be a carrier without containing carbon. For example, instead of carbon, other carriers, such as zeolite, alumina, and ceramic, may also be used. In this case, as similar to the case of using carbon as the carrier carrying the catalyst, a sum of the thickness of the catalyst layer and the thickness of the gas diffusion layer governs the thermal insulation.

As aforementioned, the embodiment of the present invention has been explained based on several examples, and the aforementioned embodiment of the present invention facilitates understanding of the present invention, but does not limit the present invention. It is needless to mention that the present invention can be modified and or improved without departing from the spirit and the scope of the claims, and equivalents thereof are included in the present invention.

What is claimed is:

1. A membrane electrode assembly for use in a fuel cell battery, the membrane electrode assembly comprising:
   an electrolyte membrane;
   an anode catalyst layer formed on a first surface of the electrolyte membrane;
   a cathode catalyst layer formed on a second surface of the electrolyte membrane;
   an anode gas diffusion layer stacked on the anode catalyst layer; and
   a cathode gas diffusion layer stacked on the cathode catalyst layer, wherein the anode catalyst layer, the cathode catalyst layer, the anode gas diffusion layer, and the cathode gas diffusion layer have the same thermal insulation performance per thickness, and
   the membrane electrode assembly satisfies all relations of $T1+T3<T2+T4$, $T1<T2$, and $T3>T4$ where a thickness of the anode catalyst layer in a stacking direction is defined as $T1$, a thickness of the cathode catalyst layer in the stacking direction is defined as $T2$, a thickness of the anode gas diffusion layer in the stacking direction is defined as $T3$, and a thickness of the cathode gas diffusion layer in the stacking direction is defined as $T4$.

2. The membrane electrode assembly according to claim 1, wherein
   the anode catalyst layer, the cathode catalyst layer, the anode gas diffusion layer, and the cathode gas diffusion layer include carbon.

3. A fuel cell battery comprising the membrane electrode assembly according to claim 1.

* * * * *